United States Patent [19]

Karlsson

[11] Patent Number: 5,125,043

[45] Date of Patent: Jun. 23, 1992

[54] IMAGE PROCESSING WITH REAL TIME ZOOM LOGIC

[75] Inventor: Magnus Karlsson, Webster Groves, Mo.

[73] Assignee: Microterm, Inc., St. Louis, Mo.

[21] Appl. No.: 657,961

[22] Filed: Feb. 20, 1991

Related U.S. Application Data

[63] Continuation of Ser. No. 370,784, Jun. 23, 1989, abandoned.

[51] Int. Cl.⁵ .............................................. G06K 9/36
[52] U.S. Cl. .................................. 382/47; 340/731; 358/180
[58] Field of Search .............. 382/47, 44; 340/731; 358/451, 180, 140, 22

[56] References Cited

U.S. PATENT DOCUMENTS

| | | | |
|---|---|---|---|
| 4,167,728 | 9/1979 | Sternberg | 340/146.3 MA |
| 4,282,546 | 8/1981 | Reitmeier | 358/22 |
| 4,532,602 | 7/1985 | DuVall | 364/577 |
| 4,532,605 | 7/1985 | Waller | 364/900 |
| 4,578,812 | 3/1986 | Yui | 382/41 |
| 4,602,346 | 7/1986 | Kawakami et al. | 364/518 |
| 4,610,026 | 9/1986 | Tabata et al. | 382/47 |
| 4,633,503 | 12/1986 | Hinman | 382/47 |
| 4,661,987 | 4/1987 | Anderson et al. | 382/41 |
| 4,774,581 | 9/1988 | Shiratsuchi | 358/180 |
| 4,792,856 | 12/1988 | Shiratsuchi | 358/180 |

Primary Examiner—Leo H. Boudreau
Assistant Examiner—Andrew W. Johns
Attorney, Agent, or Firm—Kalish & Gilster

[57] ABSTRACT

An image display station provides real time selectively zoomed direct display of a received high resolution image stored in image memory. The memory provides storage of the image input data for making available for pixel processing in each of subsequent clock intervals successive groups of adjacent pixel data values throughout a portion to be displayed of the image. User zoom control, by mouse input, selectively establishes a zoom factor for zooming of the input image. User pan control allows selecting display of desired regions of the zoomed image. User contrast control of the zoomed image is provided also by the mouse. Bilinear pixel processing of the successive groups of adjacent pixel data values is carried out throughout the displayed portion of input data within the time period of a single video display frame in accordance with the zoom factor established by the mouse input for such frame. The processing circuitry utilizes a start position in response to the user pan input for data made available from the image memory to define a displayed region of the zoomed image. The processed groups of data are pipelined and converted to analog form for on-the-fly real time video display with display contrast controlled from contrast data lookup according to the contrast input. Each of successive video frames can have a different such zoom factor and the displayed region of the zoomed image is position-shiftable by the pan input by fractional increments from one video frame to the next.

18 Claims, 11 Drawing Sheets

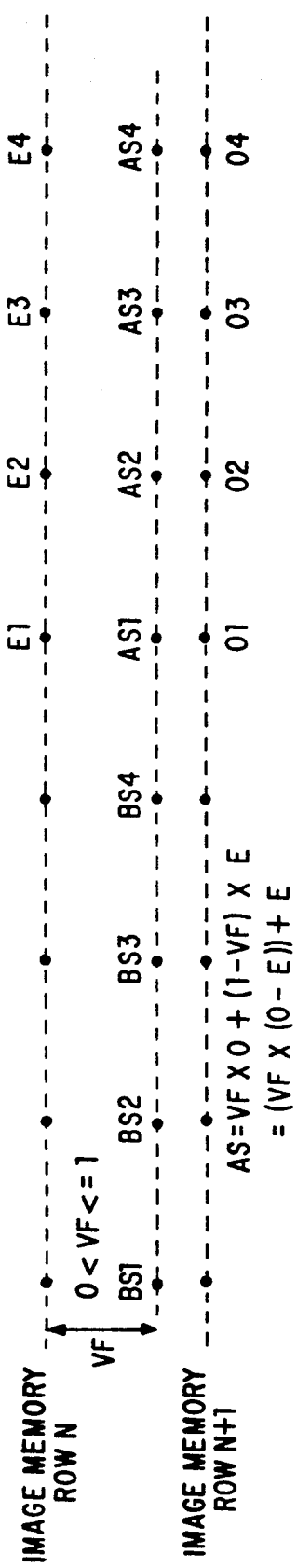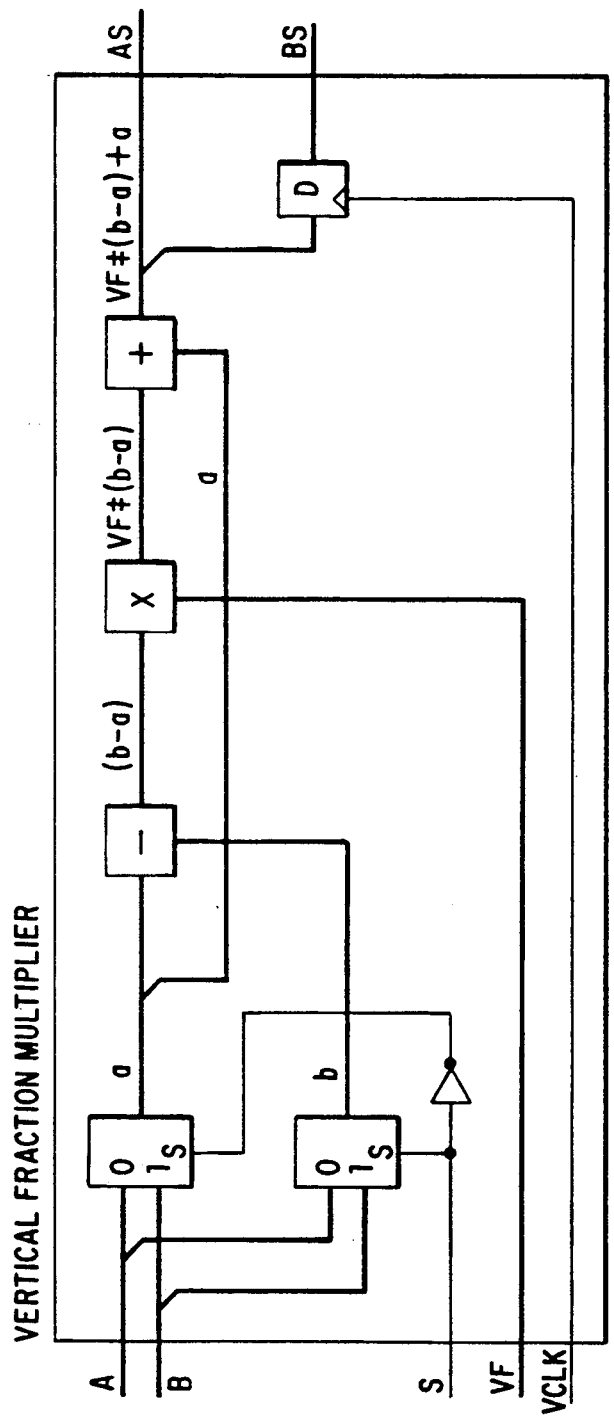
FIG. 6B
FIG. 6A $0 \leq$ AS, BS, CS, DS $\leq 7$ , INTEGER $0 <$ AHF, BHF, CHF, DHF $\leq 1$ , 8-BIT FRACTION

HORIZONTAL FRACTION MULTIPLIER

IMAGE PROCESSING WITH REAL TIME ZOOM LOGIC

This is a continuation of Ser. No. 370,784, filed Jun. 23, 1989, now abandoned.

BACKGROUND AND SUMMARY OF THE INVENTION

This application relates to image processing to provide electronic enlargement and display thereof by video technique. More particularly, it relates to image processing logic circuitry ("logic") and to an image processing station and methodology utilizing such so-called logic to provide enlargement ("zooming") of a digitally stored image in real time video display, with the image being zoomed instantaneously from the viewer's perception, i.e., "on-the-fly," and otherwise selectively controlled, as in image screen position ("pan") and contrast, while being viewed.

In high resolution image display systems, e.g., 1024×1024 image elements (pixels), the image is represented by a total of 2E20 pixels. It has heretofore been proposed to provide digital processing, whether by dedicated circuitry or microprocessor, for carrying out calculations for the determination of pixel intensity levels at positions in an enlarged image matrix. Such processing involves both position and intensity calculations. The typical time required for such calculations in known previous processing systems has been on the order of seconds, which precludes real time, on-the-fly display of the processed image. That is, the time required for providing the processed data exceeds one video frame period, as typically 1/60 sec. (noninterlaced display). The visual effect in zooming an input image for video display is, therefore, discontinuous. It is greatly desired that image zooming be carried out in real time display, i.e., completely generated from one video frame to the next, so that all zoom processing necessary for achieving a zoomed image display can be carried out within a single video frame period.

It has until the present invention been considered impossible to achieve video processing of high resolution video images from frame to frame because of the large number of calculations required per frame period. For example, Tabata et al U.S. Pat. No. 4,610,026 refers to processing times in the order of seconds for 10E6 image elements. Typically, the calculations are required to be stored as converted image data in a secondary memory, as the processing time precludes direct display.

There are various processing methods for carrying out such calculations, among which is the method of bilinear pixel interpolation, herein referred to for convenience as "BPI", with which the present invention is concerned. Shiratsuchi U.S. Pat. Nos. 4,774,581 and 4,792,856 are illustrative. In such method, the intensity at a pixel in the interpolated image is calculated based only on four pixels in the uninterpolated image whose centers surround (to the upper left, lower left, upper right and lower right, respectively) the point at which intensity is being interpolated. The interpolation is linear in both the horizontal and vertical direction. Typically, for each interpolated data point a total number of six additions and three multiplications are needed. Thus, for each of 10E6 data points, carried out in one frame period (1/60 sec. corresponding to noninterlaced display), a total number of 5.4×10E8 arithmetic operations per sec. is necessitated for the intensity calculations alone. Additional calculations are required for the position determinations. The possible processing rate for such calculations is well illustrated by Anderson et al U.S. Pat. No. 4,661,987 for merely a 500×500 interlaced (1/30 sec. frame) display, viz. 6.25×10E10 operations. Said Shiratsuchi U.S. Pat. Nos. 4,774,581 and 4,792,856 use serial processing of data by BPI for similar 1/30 sec. interlaced (1/30 sec. frame rate) display with comparable television (512×512) resolution.

Until the present invention, it is believed that the BPI method has not been used for achieving real time, on-the-fly image zooming of a high resolution (1024×1024 pixels) display. Zoomed pixel data must be provided at processing rates high enough for real time display (i.e., at least at the display frame rate).

Among the several objects of the invention are the provision of image processing circuitry and an image station providing video display of a high resolution (e.g. 1024×1024) input image using zoom processing for providing real time, on-the-fly image zoom processing of the input image without using secondary memory for intervening storage of the results of the zoom processing, but instead providing the processed data for direct screen display "on-the-fly" wherein the time required for providing processed data does not exceed one video frame period, and whereby each frame of the processed image may have a different zoom factor; which zoom processing circuitry and station uses bilinear pixel interpolation; which can be utilized to marked advantage for receiving, displaying, and analyzing images for medical and other applications requiring high resolution display, such as radiographic images; which permits contrast manipulations of such images as well as pan (position shifting) manipulation of the zoomed image; which does not require the use of auxiliary, e.g. secondary, memories for storage of the processed images but instead provides direct and instantaneous display of them in a real time mode, while permitting the user to control the image precisely and continuously as to zoom factor, contrast manipulations (such as "window and level"), and pan (i.e., display of selected regions of the zoomed image).

A related object of the invention is the provision of such zoom processing circuitry permitting the start position of each zoom-processed pixel to be calculated during the frame period to such a degree of precision that the processed image may be panned smoothly during its real time video display and continuously without user-apparent jumping or discontinuity from one frame to the next, yet permitting the zoom factor to be changed from any one frame to the next.

Briefly, the invention provides image processing apparatus, and an image display station utilizing such apparatus, for selective real time zooming of a digitized high-resolution input image, comprising image memory means for storage of input data representing the input image for making available for pixel processing in each of subsequent clock intervals successive groups of adjacent pixel data values of the input data, throughout a portion to be displayed of the input image, the apparatus further comprising at least user zoom control means for selectively establishing a zoom factor for zooming of the input image. Pixel processing means provides bilinear pixel interpolation processing of said successive groups of adjacent pixel data values throughout the displaced portion of input data within the time period of a single video display frame in accordance with a zoom factor established for such video display frame. Output means provides the pipelined processed groups of data for on-the-fly real time video display, whereby each of successive video frames may have a different such zoom factor.

The invention is disclosed in Disclosure Document 215004, filed Nov. 28, 1988, continued preservation of which is requested.

BRIEF DESCRIPTION OF THE DRAWINGS

FIGS. 6A and 6B are illustrations of the vertical interpolation carried out by the VFM, the topology of such interpolation being represented by FIG. 6A.

DESCRIPTION OF THE PREFERRED EMBODIMENT

Figure 1:
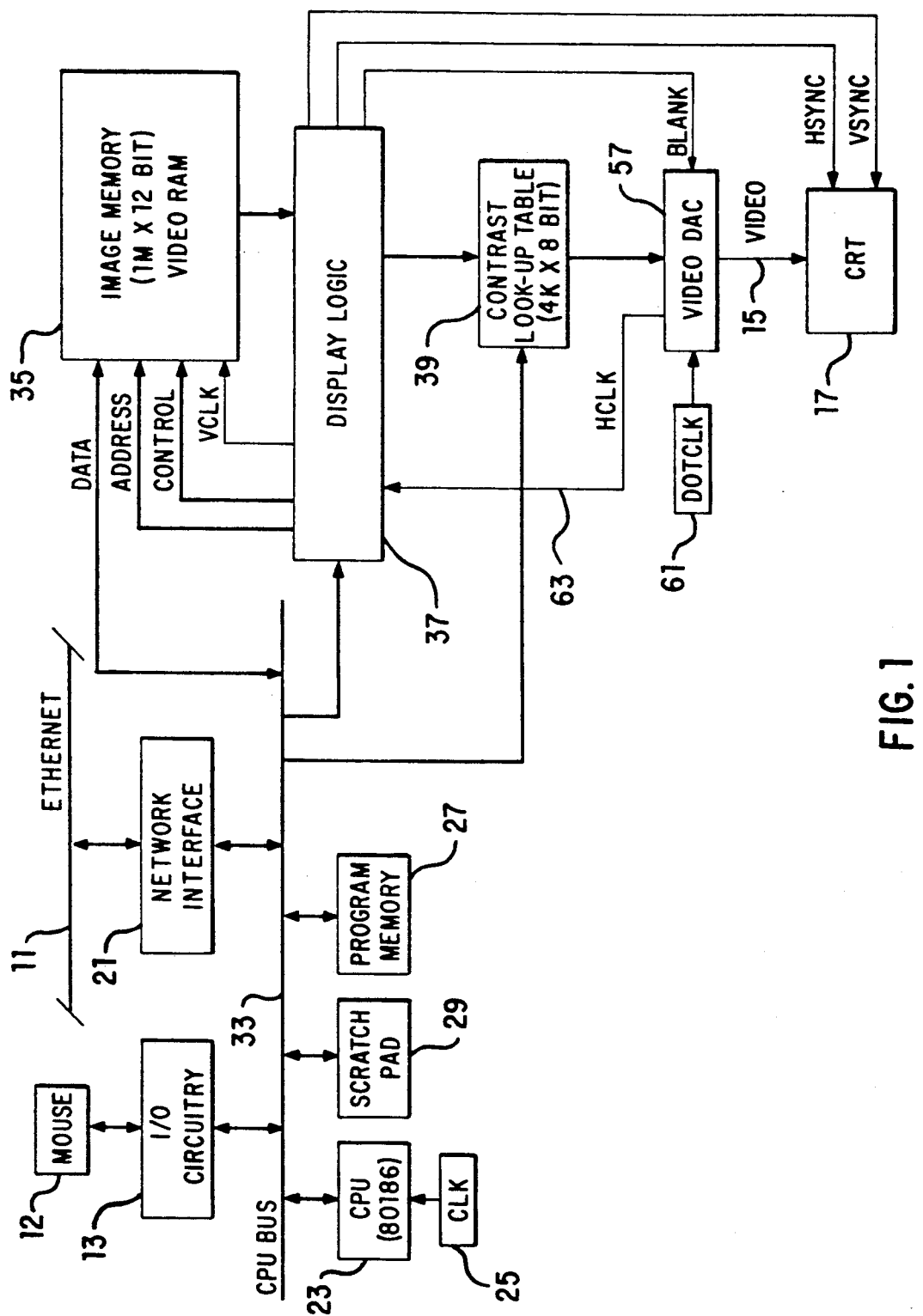
FIG. 1 is block diagram of an image display station utilizing zoom logic circuitry of the invention.

Referring to the drawings, and particularly FIG. 1, an image zoom station of the invention provides a system for receiving and storing digital image data, from an input 11, processing and manipulating the data in accordance with user manipulable input means, such as, most preferably a so-called mouse 12 through an I/O circuit 13, such as RS-232C asynchronous type, and directly providing the data, without secondary storage, by a video output 15 for direct high resolution display by a CRT 17. The CRT may be housed within a single cabinet preferably including all of the components of FIG. 1. Input 11 may be an Ethernet network input by which such image data, such as radiographic images, may be provided from a central data file storage facility (not shown). The input data may be of 1024×1024 resolution in 12-bit form, with image intensities represented as a 12-bit value for each picture element (pixel). The input data is provided by an Ethernet input/output circuit 21 of known type to CPU and logic circuitry 23, in which a CPU such as Intel type 80186 is designated at 23. The CPU is supplied with clock pulses from a conventional clock circuit 25. A suitable resident program is stored in an EPROM 27 and a small scatch pad memory 29 is used for temporary data storage, both under the control of CPU 23. Data is both input and output by a system CPU bus 33, connecting the CPU with the I/O circuitry 13, 21 and image memory circuit 35, in which the input data is stored. The system CPU bus also connects the CPU with display logic circuitry 37 and the contrast table lookup memory 39.

Mouse 12 serves as user control means for selectively establishing a zoom factor (ZF) for zooming of the input image, i.e., magnification by said zoom factor. Mouse 12 also provides user control means for selecting display of desired regions of the zoomed image, as well as serving as means for permitting selection by the user of contrast of the zoomed image, as will become apparent. Separate zoom, pan and contrast means may be used in place of mouse 12, which may otherwise be switchable between its zoom, pan and contrast control modes.

Figure 2:
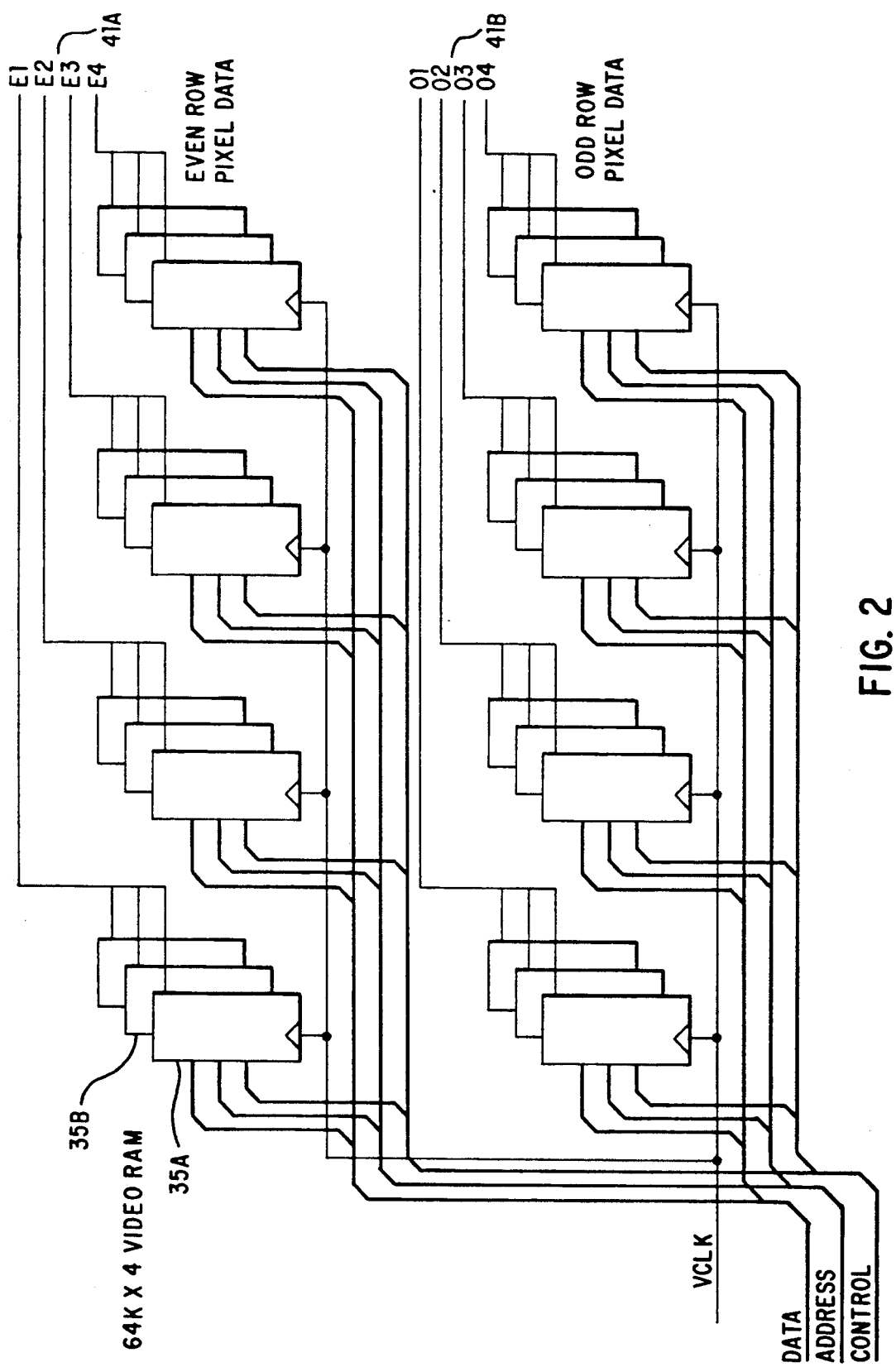
FIG. 2 is a circuit diagram of image memory circuitry of the invention.

FIG. 2 illustrates the image memory circuitry 35, wherein identical 64K×4 video RAM devices are designated as, for example, 35A and 35B to represent single plane memory with such devices arrayed in sets for storage of even and odd row data, respectively. Such devices may be of 4-bit dual port type, which are used in four groups of three each for respective even and odd row storage. Each group of three provides 12-bit intensity data storage, and consequently providing even and odd row outputs 41A, 41B, respectively through the serial port of the video RAM devices. The circuits illustrated provide storage for the upper half of the image memory, and identical circuity is used for storage of data for the lower half, thus comprising a total of 48 such memory devices. The even and odd row outputs 41A and 41B each comprise of four consecutive pixel data values so that a total of eight pixel data values (E1, E2, E3, E4, O1, O2, O3, O4) are available at one instant. The serial clock VCLK is used to clock out the data from the serial port so that at the next VCLK clock a subsequent series of 8 pixel data will be available, and so on.

The image memory circuitry 35 accordingly provides storage of adjacent even and odd row data representing the input image obtained from the Ethenet network for making available for pixel interpolation, in each of subsequent clock intervals adjacent pixel values in the even and odd row data; and then four next adjacent pixel values in each of the even and odd row data; and so forth, successively throughout the portion to be displayed of the input video image.

Figure 3:
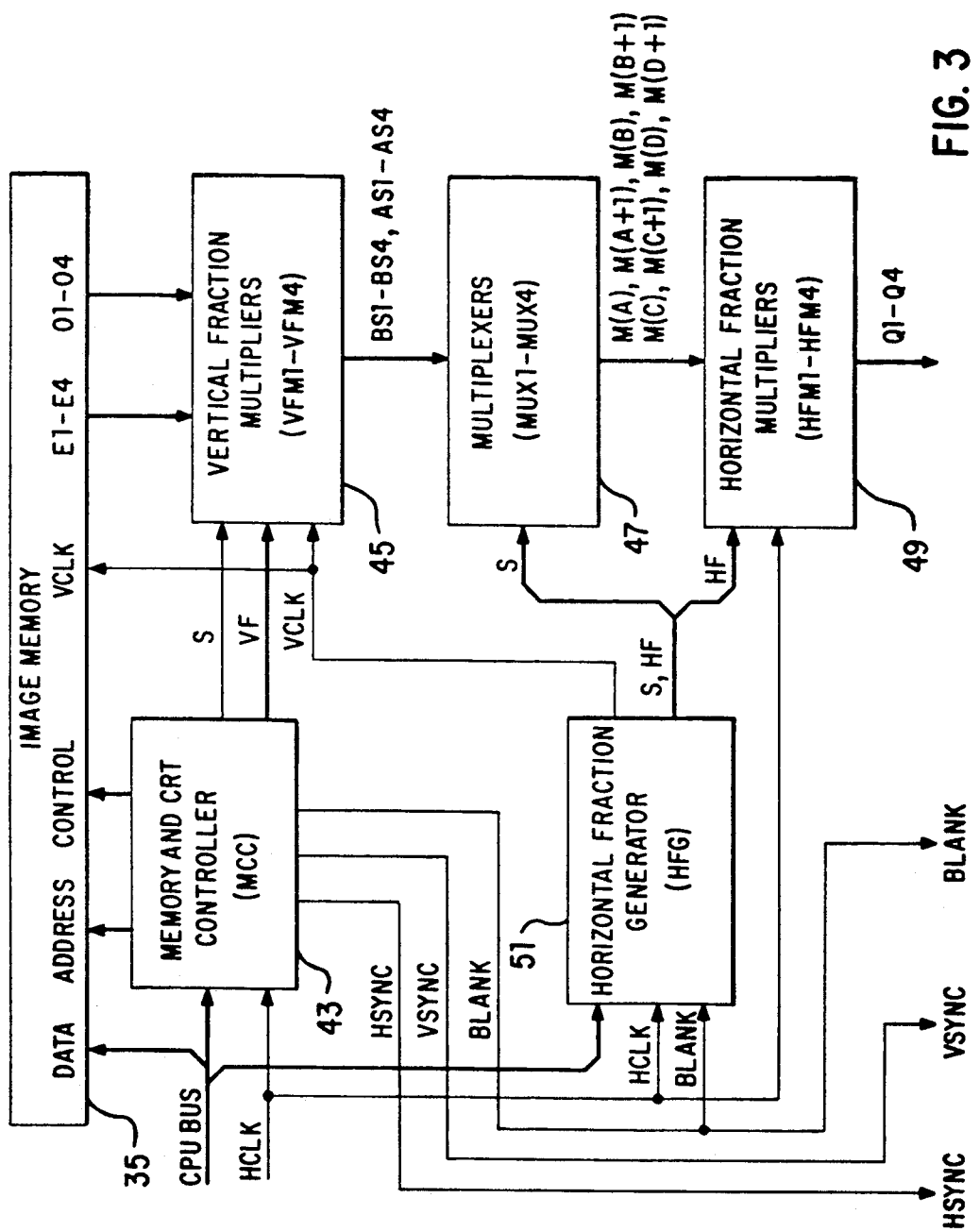
FIG. 3 is a further block diagram illustrating display logic components of the circuitry of FIG. 1.
Figure 4:
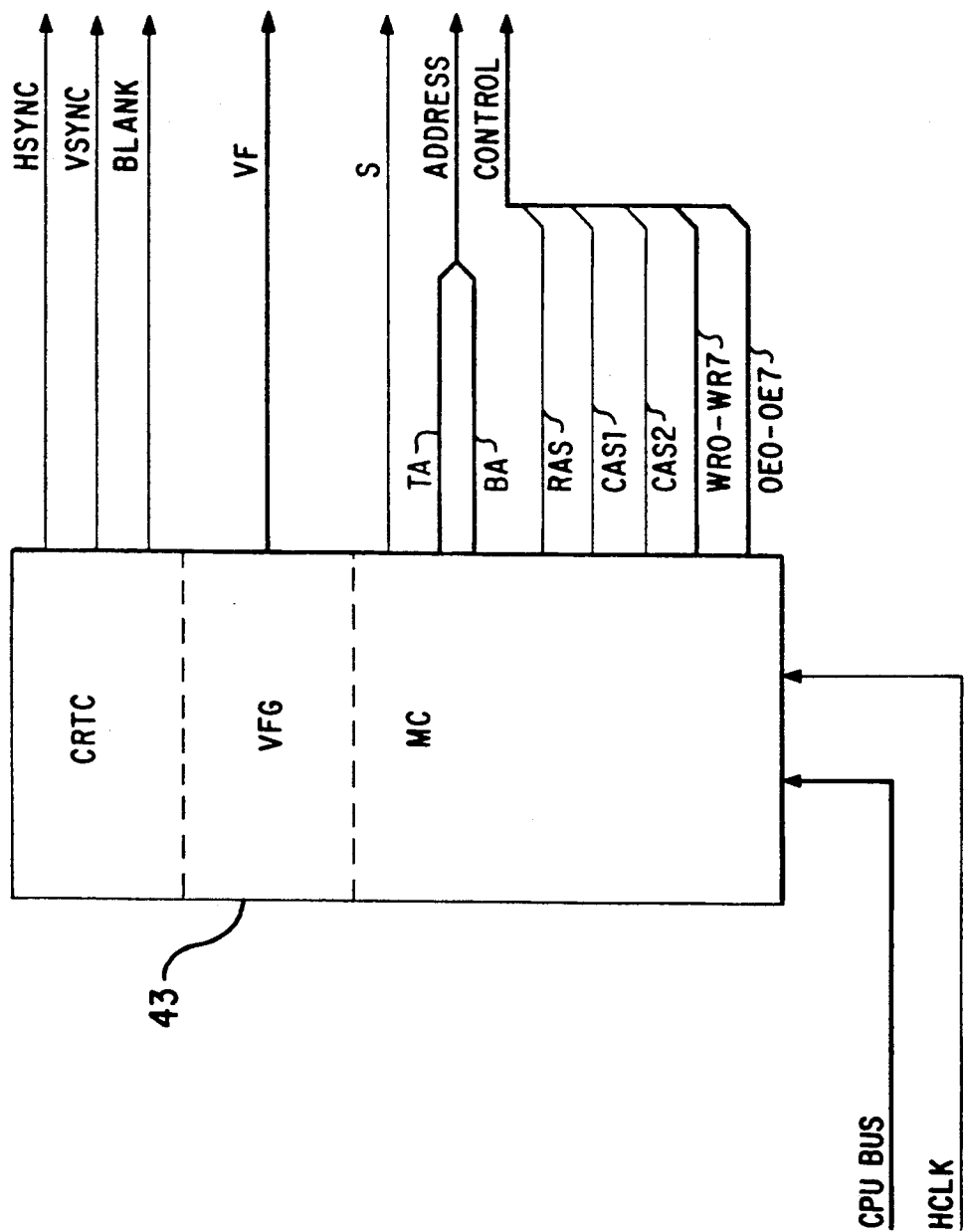
FIG. 4 is a circuit diagram of a memory and CRT controller (MCC) of the invention.
Figure 8:
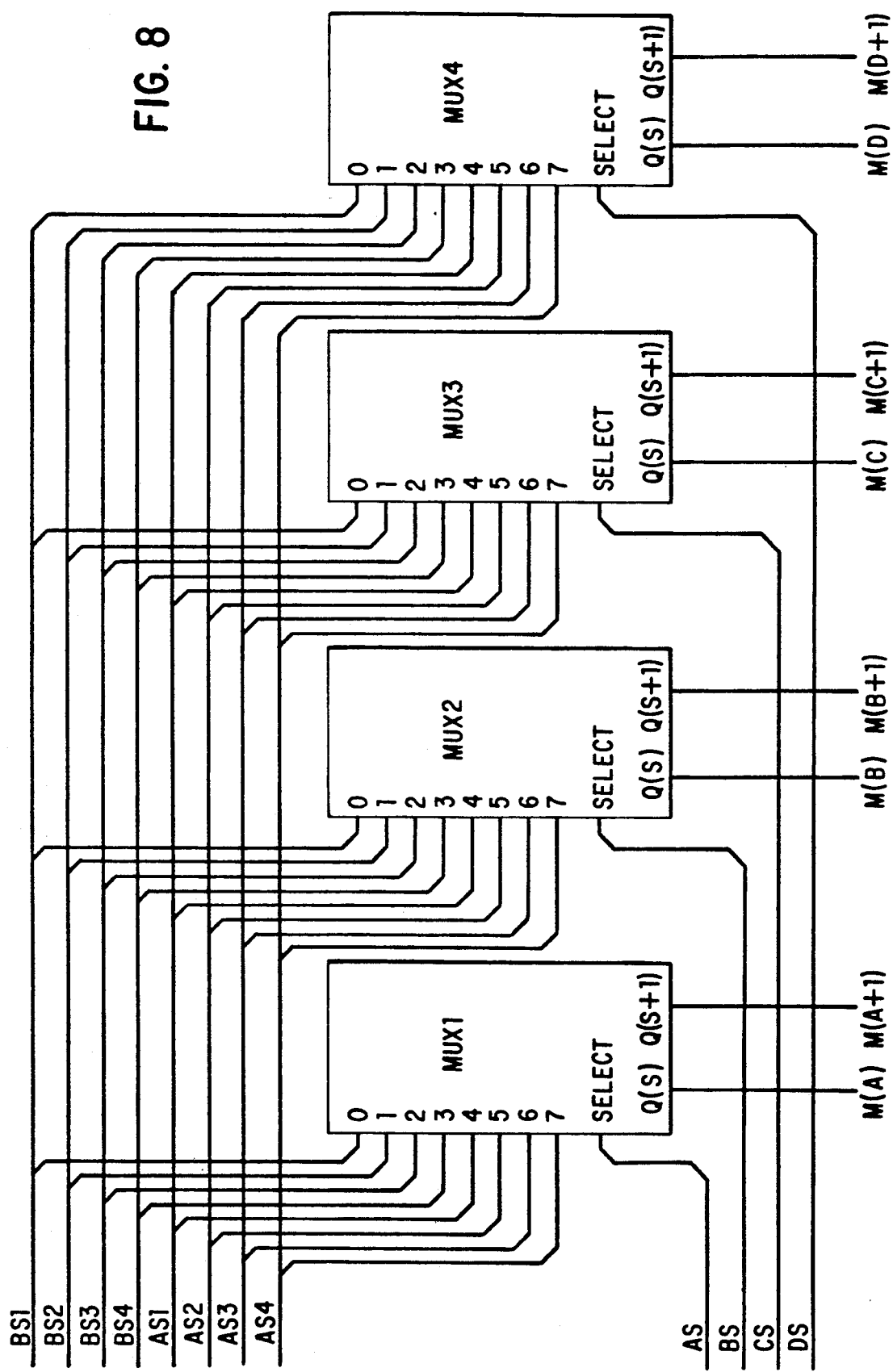
FIG. 8 is a circuit diagram of multiplexing circuitry to select data pairs for horizontal interpolation.
Figure 9:
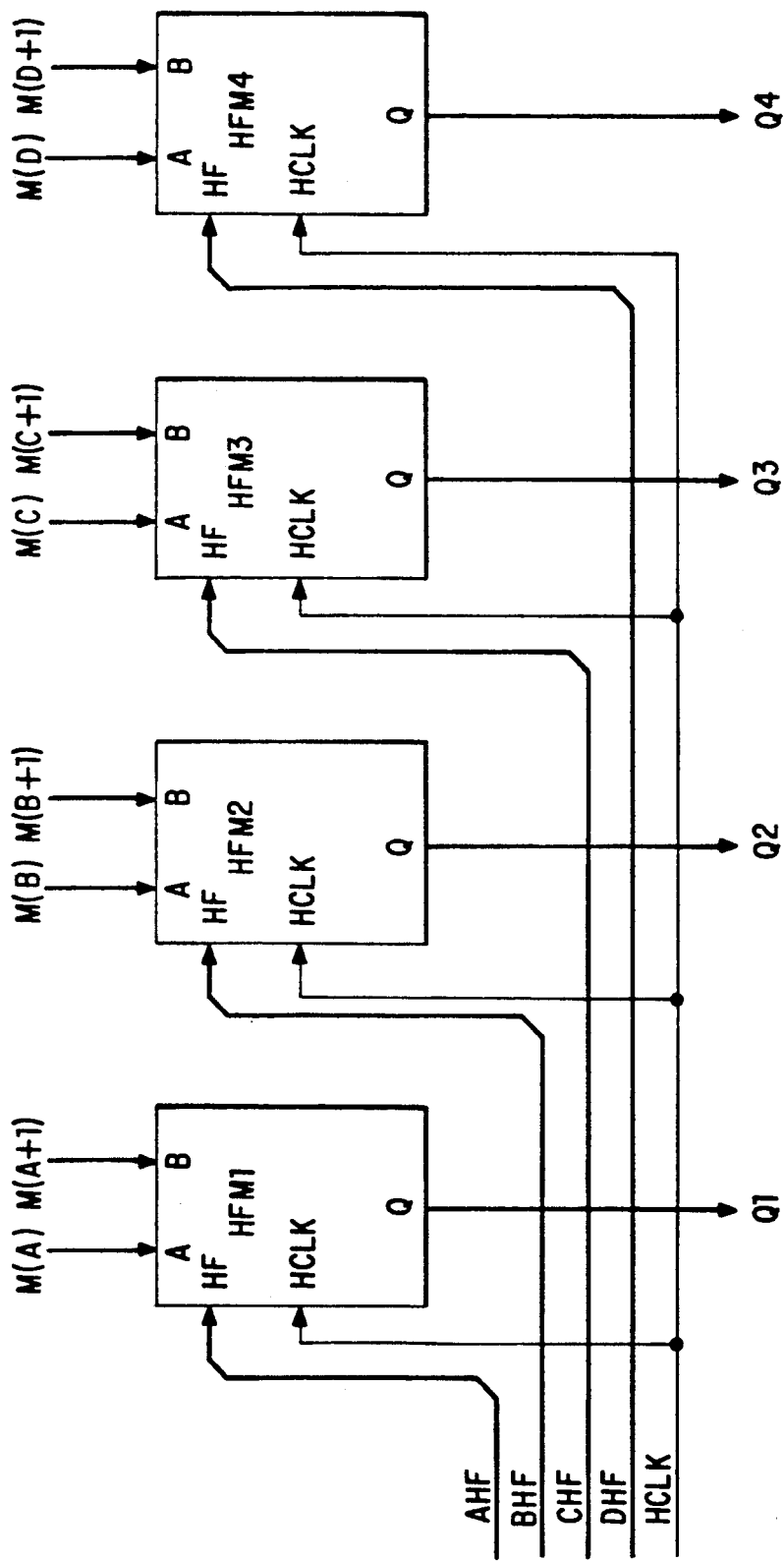
FIG. 9 is a circuit diagram of a horizontal fraction multiplier (HFM) of the invention.

Referring to FIG. 3, the display logic consists of the memory and CRT controller (MCC) (as shown in FIG. 4) an array 45 of vertical fraction multipliers VFM1-VFM4 (shown in FIG. 5), a horizontal fraction generator (HFG) 51, (shown in FIG. 7), an array 47 of multiplexers MUX1-MUX4 (shown in FIG. 8) and an array 49 of horizontal fraction multipliers HFM1-HFM4 (shown in FIG. 9).

Referring to FIG. 4, the MCC 43 circuitry takes the form of a CRT controller (CRTC), a vertical fraction generator (VFG) and a memory controller (MC).

The purpose of the CRTC is to provide the timing for the CRT monitor in accordance with signals on the CPU bus, with clocking provided by HCLK (line 63). The CRTC thus provides VSYNC and HSYNC signals, according to known practice, to the monitor for controlling beam scanning. A separate blanking signal, so designated, is provided to the VDAC (FIG. 11) described below.

The vertical fraction generator circuit (VFG) is used to calculate vertical interpolation addresses. A vertical interpolation address consists of a 10-bit integer part and an 8-bit fraction part. The integer part is used to determine which two adjacent rows of pixel data in the image RAM will be used in the vertical interpolation process. The fractional part VF is used by the vertical fraction multipliers VFM1-VFM4 to do the actual vertical interpolation. The VFG circuitry generates the vertical interpolation address by taking the vertical start position (VSP) (as determined by vertical pan location) and adding a vertical increment value (VIV) for each display scan line. The 8-bit increment value is the inverted value of a user-selected vertical zoom factor (VZF) between unity and 256 (i.e., $1 \leq VZF \leq 256$) and the vertical start position consists of a 10-bit integer part and an 8-bit fraction part so that the vertical start position can be specified down to 1/256 of the distance between two adjacent pixel rows. The VFG is loaded during vertical retrace time with the vertical start position for the first scan line on the screen. At the end of the first scan line the vertical increment value is added to the value in the VFG, making the vertical interpolation address for the second scan line. This process is repeated for each scan line until the screen is completely scanned.

The memory controller (MC) generates the odd row address (TA) and the even row address (BA) for the memory devices during CPU access cycles and data transfer cycles. It also generates the necessary timing signals (RAS and CAS1-CAS2) as well as the control signals (WR0-WR7 and OE0-OE7) for the different memory cycles. Decoding circuitry detects when the CPU is accessing the image memory and a CPU access cycle will be performed where one of the control signals (WR0-WR7 if write, OE0-OE7 if read) will be active according to A1, A2 and A11 on the CPU address bus. The TA and BA address busses will carry CPU address bits A12-A19 when RAS is strobed, and CPU address bits A3-A10 when CAS1 (or CAS2) is strobed. CPU address bit A20 selects if the upper or lower memory bank is accessed and timing signals CAS1 and CAS2 are used as memory enable signals for the upper and lower memory banks.

During each horizontal retrace time a data transfer cycle is performed followed by a CAS-before-RAS refresh cycle. The purpose of the data transfer cycle is to load a row of data from the memory matrix to a shift register in the video RAM for display during the next scan line. All 48 memory devices will perform the data transfer cycle so all OE signals (OE0-OE7) are active during the cycle according to the data transfer cycle timing specification. The video RAM address bus is used to select which memory matrix row is transferred (strobed by RAS) and the shift register starting point (strobed by CAS) when a data transfer cycle is performed. The even row memory address bus BA contains the integer part of the vertical interpolation address divided by two and the odd row memory address bus TA contains the integer part of the vertical interpolation address +1 divided by 2 when RAS is strobed. The net effect of this is that two consecutive data rows (pointed out by the integer part of the vertical interpolation address) are transfered to the shift registers inside the even and odd row video RAMs during the data transfer cycle. A select signal S (going to VFM1-VFM4) indicates the order of the two consecutive data rows (e.g. 2 and 3 vs. 4 and 3). Both address busses TA and BA contains the upper eight bits of the 10-bit integer part of the horizontal start position (as determined by horizontal pan location) when CAS1 and CAS2 are strobed during the data transfer cycle. The remaining two bits of the integer part and the 8-bit fractional part of the horizontal start position is used by the horizontal fraction generator (HFG) as a start value for the horizontal interpolation address calculation.

Figure 5:
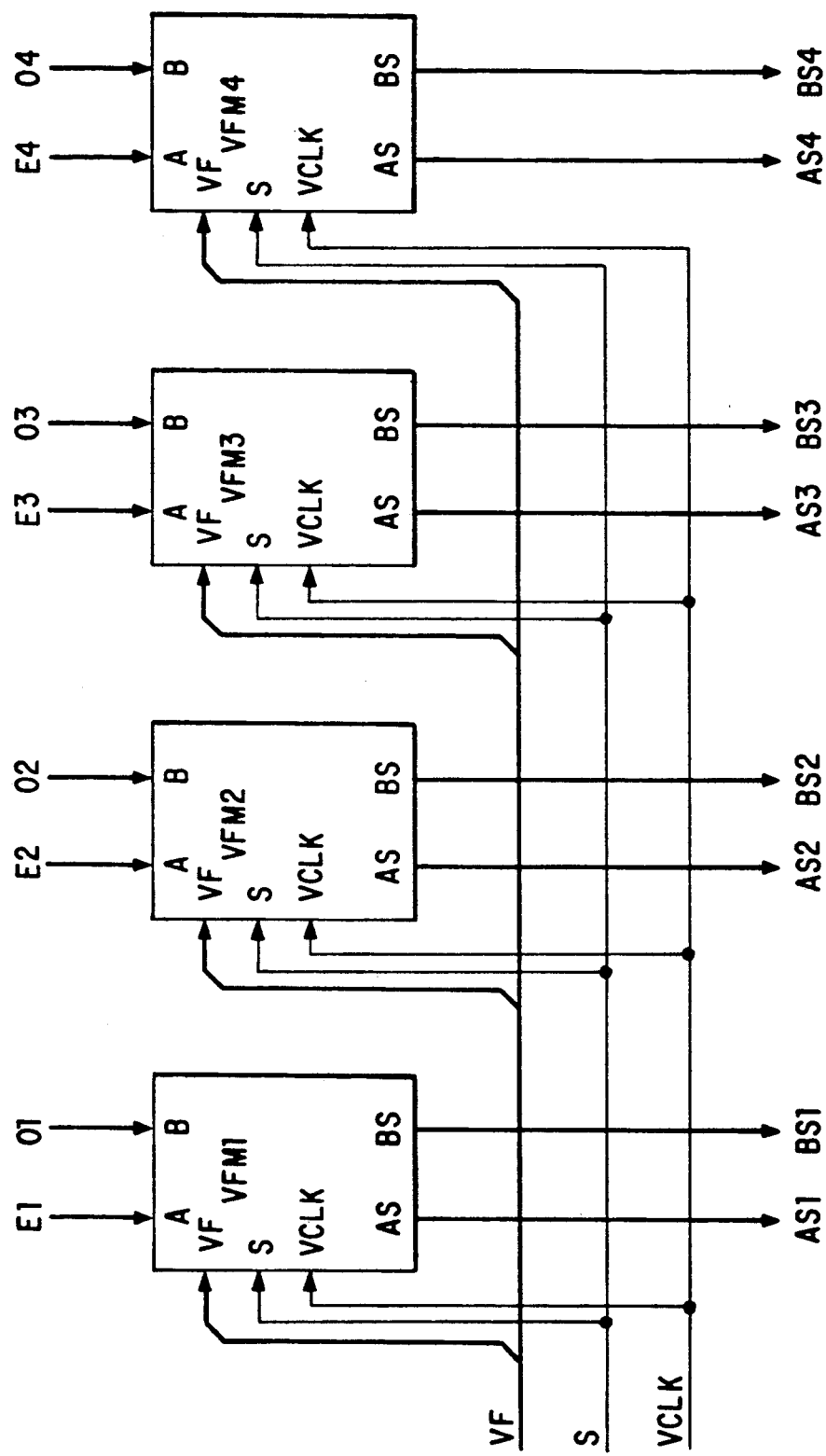
FIG. 5 is a circuit diagram of a vertical fraction multiplier (VFM) of the invention.

Referring to FIG. 5, the vertical interpolation circuitry consists of an array 45 of vertical fraction multipliers VFM1-VFM4 connected to the outputs of the even and odd row video RAMs such that each VFM gets a 12-bit pixel data value from even row memory on the A input side and the corresponding 12-bit pixel data value from odd row memory on the B input side. The VFM will perform a linear interpolation between the two pixel values according to the formula $AS = B \times VF + A \times (1 - VF)$ where AS is the resulting 12-bit interpolated value and VF is the 8-bit fractional part of the vertical interpolation address described earlier. This assumes that the A input has a lower row address (i.e., being the "upper" row) and B has a higher row address (i.e., being the "lower" row). Since this is not always the case (e.g., 4 and 3), there is an input signal S to VFM1-VFM4 that will swap the A and B inputs as needed. The interpolation is pipelined internally in the VFM and it takes several VCLK clock cycles before the result is available on the output. Once the pipeline is filled up a new interpolated data value will show up at the output for each VCLK clock pulse. The VFM also has an output BS, which is the AS output delayed one VCLK clock. Since four input pairs (E1,O1), (E2,O2), (E3,O3), (E4,O4) are processed in parallel, there are a total of eight outputs available at one instant, namely BS1, BS2, BS3, BS4, AS1, AS2, AS3, AS4. It turns out that this is eight consecutive, vertically interpolated 12-bit data values, where BS1 is the first (or leftmost) data value and AS4 is the last (or rightmost) data value. For each VCLK clock pulse the data on the BS outputs are replaced by the old AS data and the AS outputs will take new values as described above. In effect, this is shifting in four new interpolated data values from the right, discarding the four leftmost data values so that there are still eight consecutive data values available at the BS and AS outputs. FIG. 6 illustrates the relation between even and odd row memory inputs E1, E2, E3, E4, O1, O2, O3, O4 and the outputs BS1, BS2, BS3, BS4, AS1, AS2, AS3, AS4 without considering the pipeline delay effect.

Figure 7:
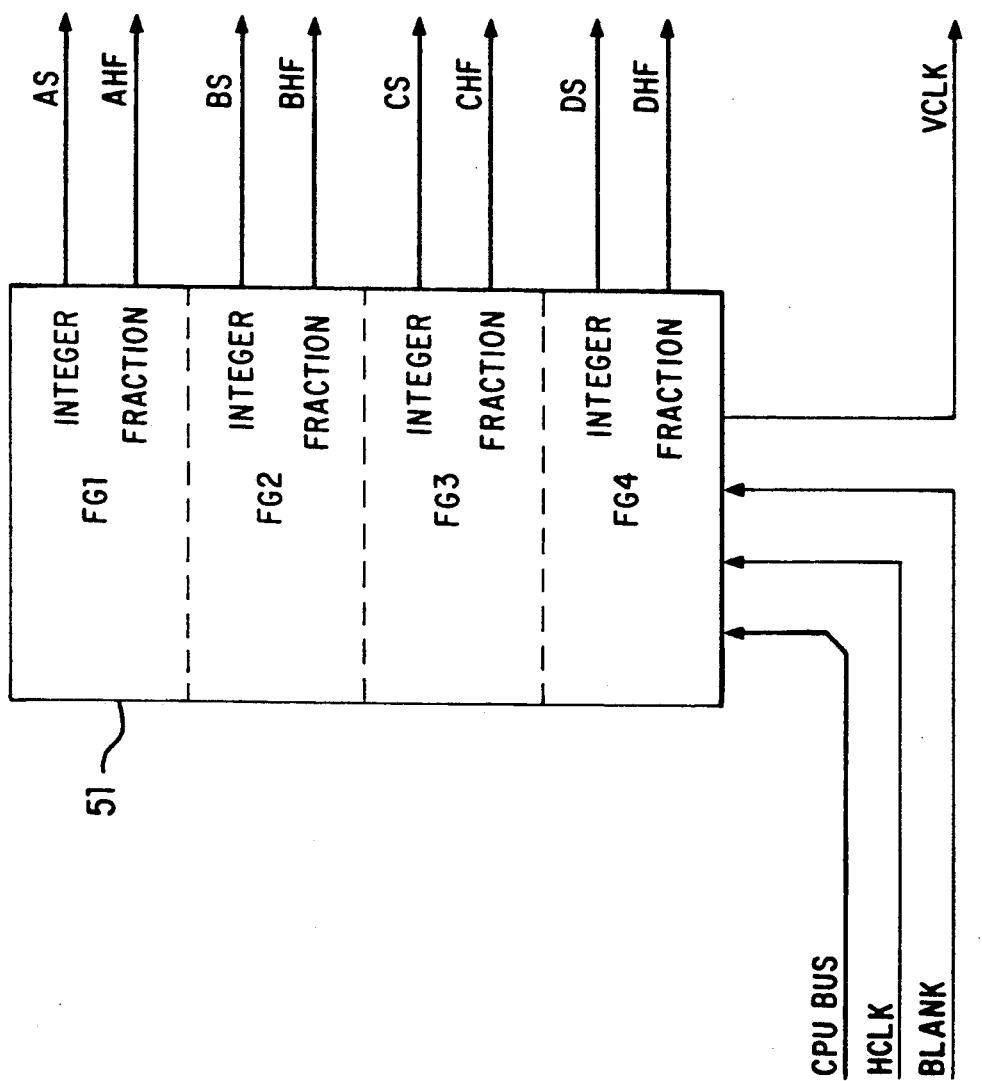
FIG. 7 is a circuit diagram illustrating the horizontal fraction generator (HFG).

FIG. 7 illustrates the horizontal fraction generator (HFG) 51, used to calculate horizontal interpolation addresses. It consists of four fraction generators FG1-FG4, each similar to the vertical fraction generator described earlier. The four fraction generators will generate four horizontal interpolation addresses, each consisting of a 3-bit integer part and 8-bit fractional part. The integer part is used by the multiplexers MUX-1-MUX4 to determine which two of the eight vertically interpolated data values will be used in the horizontal interpolation process; the fractional part HF is used by the corresponding horizontal fraction multiplier (HFM) to do the actual horizontal interpolation. The FG1-FG4 generates the horizontal interpolation addresses by taking a horizontal start position (HSP) and adding a horizontal increment value (HIV) for each new pixel position, in a fashion similar to the vertical fraction generator described earlier. The 8-bit horizontal increment value is the inverted value of a user-selected horizontal zoom factor (HZF) between unity and 256 (i.e., $1 \leq HZF \leq 256$) and the horizontal start position (HSP) consists of a 10-bit integer part and a 8-bit fraction part so that the horizontal start position can be specified down to 1/256 of the distance between two adjacent pixel locations.

It is emphasized that both vertical and horizontal start positions are thus calculated as a result of a pan input request, with a precision for each start position of 1/256 of the vertical distance between two vertically adjacent pixel locations and 1/256 of the horizontal distance between two horizontally adjacent pixel locations.

A difference between the vertical and the horizontal fraction generator lies in the fact that four horizontal interpolation addresses are generated in parallel and that video RAMs are used which are not addressed in a normal fashion but get their data clocked out serially from a starting point. The upper eight bits of the integer part of the HSP are used by the MCC 43 during the data transfer cycle to specify the video RAM shift register start position as described above. The two least significant bits of the integer part and the 8-bit fractional part of the HSP is used by the HFG as a scan line starting point (SP), specifying the starting point for FG1 within the first four of the eight vertically interpolated values coming from VFM1-VFM4. Since FG2, FG3 and FG4 generates the interpolation addresses for the next three pixel locations, they must use SP+HIV, SP+(2×HIV) and SP+(3×HIV) as starting points. For each HCLK clock pulse 4 ×HIV is added to the accumulated value in FG1-FG3. This will generate four horizontal interpolation addresses in parallel and each HCLK clock pulse will clock out the next four interpolation addresses. If the integer part of the interpolation address from FG1 becomes four or greater, the data from the outputs BS1, BS2, BS3 and BS4 from VFM1-VFM4 are no longer needed. This will generate a VCLK clock pulse, going to VFM1-VFM4 and the video RAMs, which shifts the data values on the VFM1-VFM4 outputs as described earlier so that the old data on BS1-BS4 are discarded and replaced by the old data on AS1-AS4 and new data will show up on AS1-AS4. To compensate for this shift, four must be subtracted from the accumulated value in FG1-FG4.

This sequential process will continue for the remainder of the scan line, generating horizontal interpolation addresses and VCLK clock pulses based on the accumulated data in FG1-FG4 and the HCLK clock input. During the horizontal blanking time FG1-FG4 are reloaded with the starting values as described earlier and a video RAM data transfer cycle is performed, loading the video RAM shift registers with new data for the next scan line.

FIG. 8 illustrates the multiplexing circuitry MUX1-MUX4. The purpose of the multiplexing circuitry is to select four sets of two adjacent data values from the eight data values coming from the vertical fraction multipliers VFM1-VFM4, to be used by the horizontal fraction multipliers HFM1-HFM4 in the horizontal interpolation process. Each of the four multiplexers has the same eight 12-bit input values BS1, BS2, BS3, BS4, AS1, AS2, AS3, AS4 and a 3-bit select input. The select input comes from the integer part of the corresponding horizontal interpolation address, and it selects two adjacent data values from the eight input values (e.g., select=0 selects BS1 and BS2) to be fed to the corresponding horizontal fraction multiplier as the 12-bit inputs A and B.

Figure 10B:
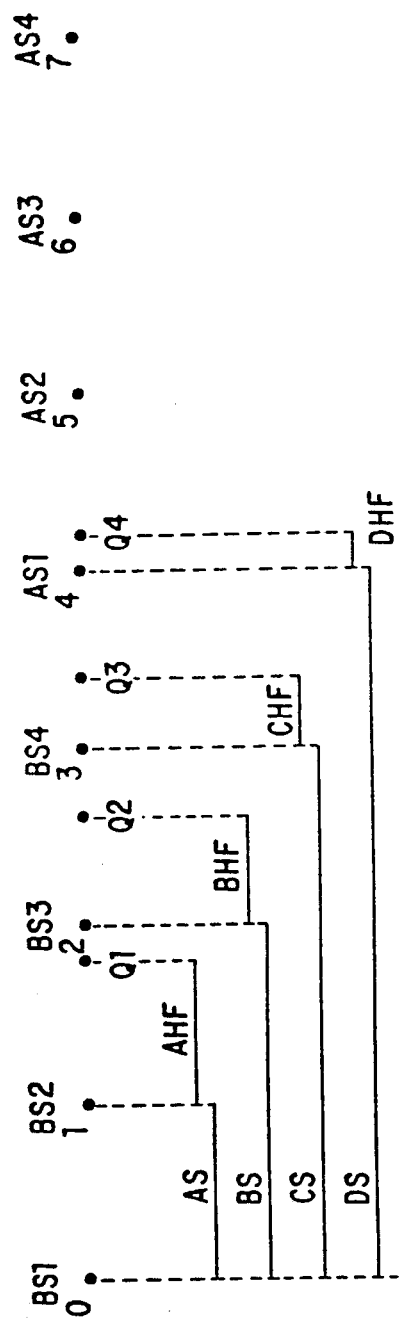
FIGS. 10A and 10B are illustrations of the horizontal interpolation carried out by the HFM, the topology of which is represented in FIG. 10B.
Figure 10A:
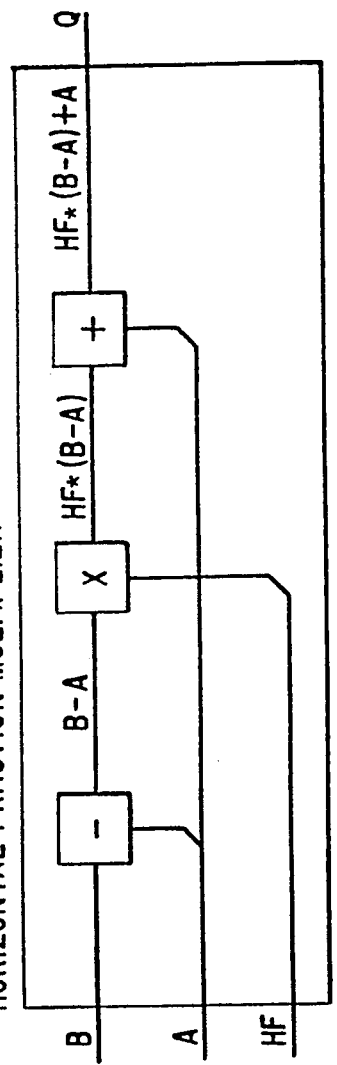

Referring to FIG. 9, the horizontal interpolation circuitry consists of an array 49 of horizontal fraction multipliers HFM1-HFM4 connected to the outputs of the multiplexing circuitry MUX1-MUX4 as described above. The HFM will perform a linear interpolation between the two input data values A and B according to the formula, $Q = B \times HF + A \times (1 - HF)$, where Q is the resulting 12-bit interpolated value and HF is the 8-bit fractional part of the horizontal interpolation address described before. The interpolation is pipelined internally in the HFM and it takes several HCLK clock cycles before the result is available at the Q output. Once the pipeline is filled up a new interpolated data value will show up at the output for each HCLK clock pulse. FIG. 10 illustrates the relation between the inputs BS1, BS2, BS3, BS4, AS1, AS2, AS3 and AS4 (to the multiplexers MUX1-MUX4) and the outputs Q1-Q4 (from HFM1-HFM4) without considering the pipeline delay effect.

From the foregoing, it is apparent that there are both means for performing linear vertical interpolation between pixels of adjacent rows of data in accordance with the zoom factor as they are made available from the vertical start position; and means for performing linear horizontal interpolation between horizontally adjacent pixels of each of adjacent rows of data as they are made available from the horizontal start position, wherein the vertical interpolation means comprises a vertical fraction generator for calculating vertical interpolation addresses including the vertical start position and a vertical increment value for each pair of adjacent lines of the input image, and vertical fraction multiplier array receiving said vertical interpolation addresses for providing intermediate interpolation data to a multiplexer array, and the horizontal interpolation means comprises a horizontal fraction generator for calculating horizontal interpolation addresses based upon the horizontal start position and a horizontal interpolation increment value, the multiplexer array receiving said horizontal addresses for selecting horizontal interpolation input data to an array of horizontal fraction multipliers from said intermediate interpolation data, thereby generating zoomed image pixel data.

Figure 11:
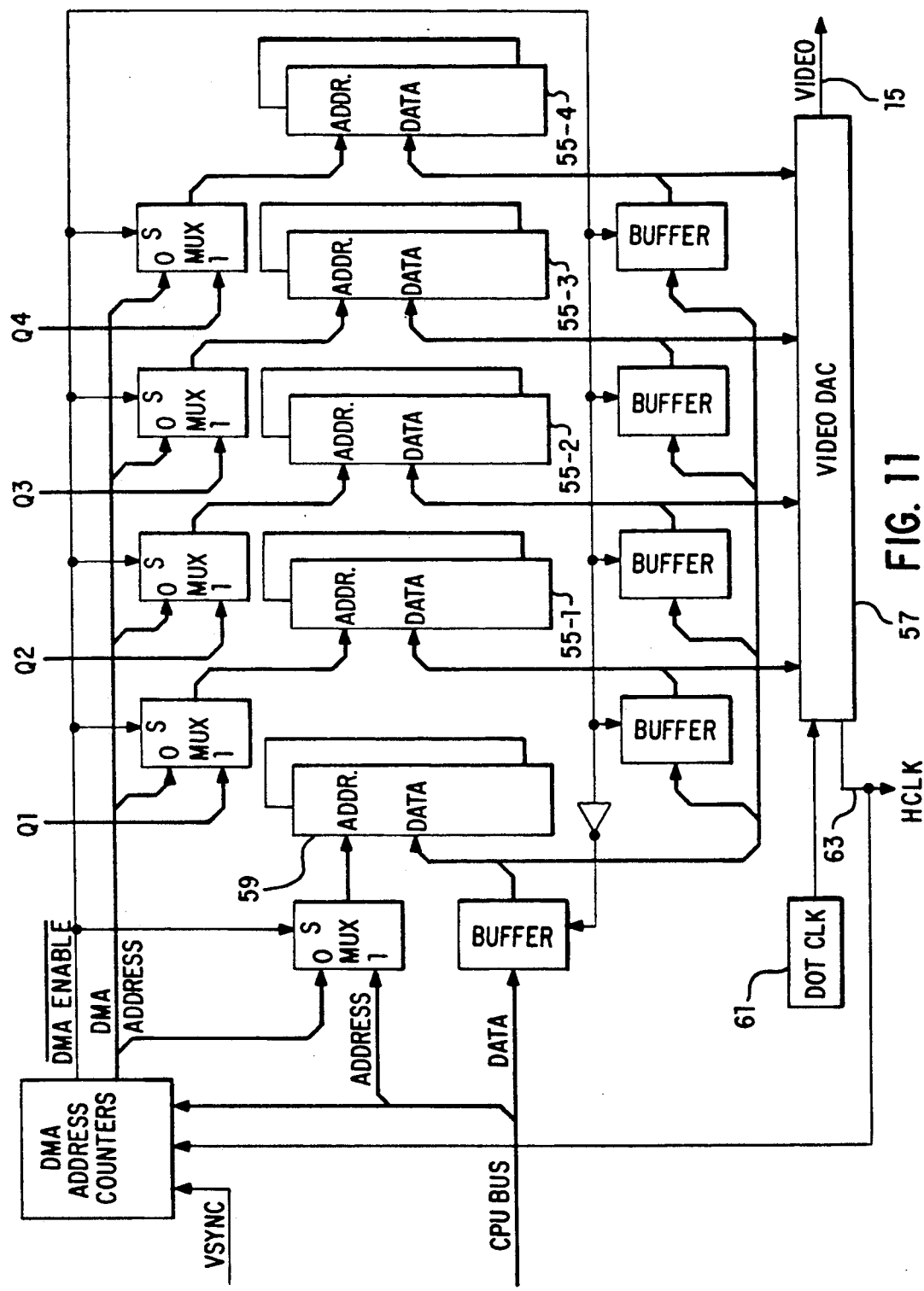
FIG. 11 illustrates the contrast table lookup components of circuitry of the invention.

FIG. 11 shows the contrast table lookup memory 53 which comprises four pairs of high speed static lookup table RAM devices 55-1 through 55-4, each of 4K×4 type. Each pair is supplied with the 12-bit data from the respective HFM so that each thus provides mapping of the 12-bit data into 8-bit output to a video digital-to-analog converter (VDAC) 57. Contrast data is stored in the lookup table RAM pairs by DMA (direct memory access) transfer from a pair 59 of 4K×4 high speed static RAM devices. These obtain the contrast data from the CPU bus 33 according to the system settings and/or user input device 12. Once a complete contrast table has been created in the pair 59, it is transfered by DMA to the lookup table RAM's during the vertical blanking interval so that the contrast lookup tables can be completely updated between two consecutive video frames.

VDAC 57 takes four 8-bit intensity values in parallel and shifts them out serially. The output of the VDAC is determined by strobing by a master clock 61 operating, for example, at 87 MHz, and so the VDAC output constitutes the video output 15. The VDAC divides the output of clock 61 by a factor of 4 to provide a clock signal termed HCLK, on a line designated at 63 in FIG. 1.

In view of the foregoing, it will be seen that the several objects of the invention are achieved and other advantages are attained.

Although the foregoing includes a description of the best mode contemplated for carrying out the invention, various modifications are contemplated.

For example, the technique of the invention may be utilized for providing zoomed display of color images by using multiple memory planes for initial storage of red, green and blue image data, each such plane having its own zoom and pan (and contrast manipulation) data in accordance with the presently disclosed technique.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. Image processing apparatus for selective high-resolution real time zooming of a digitized high-resolution input image of at least 1024 × 1024 pixels each of image intensity represented as a 12-bit value, with at least 12-bit image zoom processing accuracy to provide at least 1/60 sec. zoomed image display frame rate, comprising:
   image memory means for storage of input data representing the input image for making available for pixel processing in each of subsequent clock intervals successive groups of adjacent pixel data values of the input data, throughout a portion to be displayed of the input image;
   user zoom control means for selectively establishing a zoom factor for zooming of the input image;
   pixel processing means for bilinear pixel interpolation processing of the successive groups of adjacent pixel data values throughout the displayed portion of the input data within the time period of a single video display frame in accordance with a zoom factor established for said video display frame, the pixel processing means including means for processing in parallel a plurality of adjacent line pairs during each video frame time period for providing a plurality of bilinearly interpolated processed outputs at one instant with at least 12-bit accuracy; and
   output means for providing the processed groups of data for on-the-fly real time video display with a processed output data rate of at least 1024 × 1024 × 60 pixels per second, whereby each of successive video frames may have a different such zoom factor during each display frame.

2. Image processing apparatus according to claim 1 further comprising:
   user pan control means for selecting display of desired regions of the zoomed image;
   said pixel processing means including means, responsive to the user pan control means, for determining within the time period of a single video display frame both vertical and horizontal start positions within the input data for data made available from the image memory means, where the vertical start position can be specified with predetermined resolution to a fraction of the vertical distance between two vertically adjacent pixel locations and the horizontal start position can be specified with predetermined resolution to a fraction of the horizontal distance between two horizontally adjacent pixel locations;
   whereby to permit a displayed region of the zoomed image to be position shifted from one video frame to to the next video frame according to user control.

3. Image processing apparatus according to claim 2 wherein the predetermined resolution of vertical and horizontal start positions are each at least 1/256 of the distance between adjacent pixels.

4. Image processing apparatus for selective high-resolution real time zooming of a stored digitized input image of at least 1024 × 1024 pixels each of image intensity represented as a 12-bit value, with at least 12-bit image zoom processing accuracy to provide at least 1/60 sec. zoomed image display frame rate, comprising
   zoom control means for selectively establishing a zoom factor for zooming of the input image;
   user pan control means provides for selecting display of desired regions of the zoomed image;
   pixel processing means for processing of successive groups of adjacent pixel data values throughout a portion to be displayed of input data within the time period of a single video display frame in accordance with a zoom factor established for said video display frame;
   said pixel processing means including means, responsive to the user pan control means, for determining within the time period of a single video display frame both vertical and horizontal start positions within the input data for data made available from the stored image, where the vertical start position can be specified with predetermined resolution to a fraction of the vertical distance between two vertically adjacent pixel locations and the horizontal start position can be specified with predetermined resolution to a fraction of the horizontal distance between two horizontally adjacent pixel locations, the pixel processing means including means for processing in parallel a plurality of adjacent line pairs during each video frame time period for providing a plurality of bilinearly interpolated processed outputs at one instant with at least 12-bit accuracy;
   output means for providing the processed groups of data in pipelined sequence for on-the-fly real time video display with a processed output data rate of at least 1024 × 1024 × 60 pixels per second, whereby to permit a displayed region of the zoomed image to be position shifted by said fractional increments smoothly from one video frame to the next video frame according to user control.

5. Image processing apparatus according to claim 4 wherein the predetermined resolution of vertical and horizontal start positions are each at least 1/256 of the distance between adjacent pixels.

6. Image processing apparatus according to claim 4 wherein the pixel processing means comprises:
   means for performing linear vertical interpolation between pixels of adjacent rows of data in accordance with the zoom factor as they are made available from the vertical start position; and
   means for performing linear horizontal interpolation between horizontally adjacent pixels of each of adjacent rows of data as they are made available from the horizontal start position.

7. Image processing apparatus according to claim 6 wherein the vertical interpolation means comprises a vertical fraction generator for calculating vertical interpolation addresses including the vertical start position and a vertical increment value for each pair of adjacent lines of the input image, and vertical fraction multiplier array receiving said vertical interpolation addresses for providing intermediate interpolation data to a multiplexer array, and the horizontal interpolation means comprises a horizontal fraction generator for calculating horizontal interpolation addresses based upon the horizontal start position and a horizontal interpolation increment value, the multiplexer array receiving said horizontal addresses for selecting horizontal interpolation input data to an array of horizontal fraction multipliers from said intermediate interpolation data, thereby generating zoomed image pixel data.

8. Image processing apparatus according to claim 6 further comprising image memory means for receiving and storing the digitized input image, including first and second portions of memory for storage, respectively, of said even and odd row data of the input image, and futher comprising means for swapping even and odd row data relationship as each of pairs of adjacent rows of data are made available for pixel interpolation, the vertical interpolation addresses being based upon said swapping of even and odd row data relationship as each new pair of adjacent lines of the input image is made available.

9. An image display station for providing real time selectively zoomed direct display of a high-resolution image of at least 1024 × 1024 pixels each of image intensity represented as a 12-bit value, with at least 12-bit image zoom processing accuracy to provide at least 1/60 sec. zoomed image display frame rate, comprising
input means for receiving a digital input image for zoom processing;
image memory means for storage of input data representing the input image for making available for pixel processing in each of subsequent clock intervals successive groups of adjacent pixel data values of the input data, throughout a portion to be displayed of the input image;
user zoom control means for selectively establishing a zoom factor for zooming of the input image;
user pan control means for selecting display of desired regions of the zoomed image;
pixel processing means for processing of said successive groups of adjacent pixel data values throughout the displayed portion of input data within the time period of a single video display frame in accordance with a zoom factor established for said video display frame, the pixel processing means including means for processing in parallel a plurality of adjacent line pairs during each video frame time period for providing a plurality of bilinearly interpolated processed outputs at one instant with at least 12-bit accuracy; and
the pixel processing means comprising means for determining a start position in response to the user pan control means for data made available from the image memory means whereby to define a display region of the zoomed image according to user control; and
output means, including for providing the processed groups of data and for converting the processed groups of data to analog form for on-the-fly real time video display with a processed output data rate of at least 1024 × 1024 × 60 pixels per second, whereby each of successive video frames may have a different said zoom factor and whereby a displayed region of the zoomed image can be position shifted from one video frame to the next video frame according to user control.

10. An image display station according to claim 9 and further comprising:
user contrast control means provides for selecting contrast of the zoomed image, and
contrast memory means for storing contrast data for being made available to the output means in response to the user contrast control means whereby to define contrast of the zoomed image according to user control, whereby each of successive video frames may have a different contrast setting.

11. An image display station according to claim 1 wherein the user zoom, pan and contrast control means each is provided by a so-called mouse switchable between different zoom, pan and contrast control modes.

12. An image display station according to claim 9 wherein the pixel processing means includes means for bilinear pixel interpolation simultaneous processing of four successive groups of adjacent pixel data values at a time throughout the displayed portion of input data within the time period of a single video display frame in accordance with a zoom factor established for said video display frame, and pipeline means for pipelining processed groups of data; the output means providing the pipelined processed groups of data for said real time video display.

13. An image display station according to claim 12 wherein the pixel processing means comprises:
means, responsive to the user pan control means, for determining within the time period of a single video display frame both vertical and horizontal start positions within the input data for data made available from the image memory means, where the vertical start can be specified with predetermined resolution to a fraction of the vertical distance between two vertically adjacent pixel locations and the horizontal start position can be specified with predetermined resolution to a fraction of the horizontal distance between two horizontally adjacent pixel locations;
means for performing linear vertical interpolation between pixels of adjacent rows of data in accordance with the zoom factor as they are made available from the vertical start position; and
means for performing linear horizontal interpolation between horizontally adjacent pixels of each of adjacent rows of data as they are made available from the horizontal start position.

14. An image display station according to claim 13 wherein the vertical interpolation means comprises a vertical fraction generator for calculating vertical interpolation addresses including the vertical start position and a vertical increment value for each pair of adjacent lines of the input image, and vertical fraction multiplier array receiving said vertical interpolation addresses for providing intermediate interpolation data to a multiplexer array, and the horizontal interpolation means comprises a horizontal fraction generator for calculating horizontal interpolation addresses based upon the horizontal start position and a horizontal interpolation increment value, the multiplexer array receiving said horizontal addresses for selecting horizontal interpolation input data to an array of horizontal fraction multipliers from said intermediate interpolation data, thereby generating zoomed image pixel data.

15. An image display station according to claim 14 wherein said image memory means includes first and second portions of memory for storage, respectively, of even and odd row data, and further comprising means for swapping even and odd row data relationship as each of pair of adjacent rows of data are made available for pixel interpolation, the vertical interpolation addresses being based upon said swapping of even and odd row data relationship as each new pair of adjacent lines of the input image is made available.

16. An image display station according to claim 9 wherein the input means is adapted for receiving the input image from an Ethernet source.

17. An image display station for providing real time selectively zoomed direct display of a high-resolution image of at least 1024×1024 pixels each of image intensity represented as a 12-bit value, with at least 12-bit image zoom processing accuracy to provide at least 1/60 sec. zoomed image display frame rate, comprising
input means for receiving a digital input image for zoom processing;
image memory means for storage of input data representing the input image for making available for pixel processing in each of subsequent clock intervals successive groups of adjacent pixel data values of the input data, throughout a portion to be displayed of the input image;
user zoom control means for selectively establishing a zoom factor for zooming of the input image;
user pan control means for selecting display of desired regions of the zoomed image;
user contrast control means provides for selecting contrast of the zoomed image, and
pixel processing means for processing of said successive groups of adjacent pixel data values throughout the displayed portion of input data within the time period of a single video display frame in accordance with a zoom factor established for said video display frame, the pixel processing means including means for processing in parallel a plurality of adjacent line pairs during each video frame time period for providing a plurality of bilinearly interpolated processed outputs at one instant with at least 12-bit accuracy; and
real time processing means comprising means for determining a start position in response to the user pan control means for data made available from the image memory means whereby to define a displayed region of the zoomed image according to user control;
output means, including for providing the processed groups of data and for converting the processed groups of data to analog form for on-the-fly real time video display with a processed output data rate of at least 1024×1024×60 pixels per second, whereby each of successive video frames may have a different said zoom factor and whereby a displayed region of the zoomed image can be position shifted from one video frame to the next video frame according to user control; and
contrast memory means for storing contrast data for being made available to the output means in response to the user contrast control means to define contrast of the zoomed image according to user control, whereby each of successive video frames may have a different contrast setting.

18. Image processing apparatus for selective real time zooming of a high-resolution image of at least 1024×1024 pixels each of image intensity represented as a 12-bit value, with at least 12-bit image zoom processing accuracy to provide at least 1/60 sec. zoomed image display frame rate, comprising
input means for receiving a digital input image for zoom processing;
image memory means for storage of input data representing the input image for making available for pixel interpolations in each of subsequent clock intervals successive groups of adjacent pixel data values of the input data, throughout a portion to be displayed of the input image;
user control means for selectively establishing a zoom factor for zooming of the input image;
digital linear pixel interpolation means comprising
digital means for performing linear vertical interpolation between pixels of adjacent rows of data in accordance with said zoom factor as they are made available, the pixel processing means including means for processing in parallel a plurality of adjacent line pairs during each video frame time period for providing a plurality of bilinearly interpolated processed outputs at one instant; and
digital means for performing linear horizontal interpolation between horizontally adjacent pixels of each of adjacent rows of data as they are made available;
to provide thereby a plurality of successive groups of digital zoomed pixel data with at least 12-bit accuracy at a time successively corresponding to a zoomed realization of the input image for on-the-fly real time output thereof, the zoomed pixel data having an output data rate of at least 1024×1024×60 pixels per second, and whereby each such real time output of the zoomed data may have a different such zoom factor.

* * * * *